(12) United States Patent
Dabrowski

(10) Patent No.: US 9,033,794 B2
(45) Date of Patent: May 19, 2015

(54) METHOD AND APPARATUS FOR PROVIDING SECURE AND ANONYMOUS CASH-OUT AND CASH-IN VALUES IN A GAMING SYSTEM

(71) Applicant: Stanley P. Dabrowski, Las Vegas, NV (US)

(72) Inventor: Stanley P. Dabrowski, Las Vegas, NV (US)

(*) Notice: Subject to any disclaimer, the term of this patent is extended or adjusted under 35 U.S.C. 154(b) by 0 days.

(21) Appl. No.: 14/486,920

(22) Filed: Sep. 15, 2014

(65) Prior Publication Data

US 2015/0005058 A1    Jan. 1, 2015

Related U.S. Application Data

(63) Continuation of application No. 11/386,341, filed on Mar. 22, 2006, now Pat. No. 8,834,264.

(51) Int. Cl.
*G06F 17/00* (2006.01)
*G07F 17/32* (2006.01)

(52) U.S. Cl.
CPC ............ *G07F 17/3244* (2013.01); *G07F 17/32* (2013.01); *G07F 17/3206* (2013.01); *G07F 17/3241* (2013.01)

(58) Field of Classification Search
USPC .......................................................... 463/29
See application file for complete search history.

(56) References Cited

U.S. PATENT DOCUMENTS

| | | |
|---|---|---|
| 4,880,237 A | 11/1989 | Kishishita |
| 5,179,517 A | 1/1993 | Sarbin et al. |
| 5,239,165 A | 8/1993 | Novak |
| 5,251,738 A | 10/1993 | Dabrowski |
| 5,265,874 A | 11/1993 | Dickinson et al. |
| 5,290,033 A | 3/1994 | Bittner et al. |
| 5,371,345 A | 12/1994 | LeStrange et al. |
| 5,420,406 A | 5/1995 | Izawa et al. |
| 5,470,079 A | 11/1995 | LeStrange et al. |
| 5,544,728 A | 8/1996 | Dabrowski |
| 5,557,086 A | 9/1996 | Schulze et al. |
| 5,577,959 A | 11/1996 | Takemoto et al. |
| 5,580,311 A | 12/1996 | Haste, III |
| 5,595,538 A | 1/1997 | Haste, III |
| 5,709,603 A | 1/1998 | Kaye |
| 5,764,789 A * | 6/1998 | Pare et al. ............... 382/115 |
| 5,772,510 A | 6/1998 | Roberts |
| 5,791,990 A | 8/1998 | Schroeder et al. |
| 5,818,026 A | 10/1998 | Melling et al. |
| 5,915,588 A | 6/1999 | Stoken et al. |
| 6,012,832 A | 1/2000 | Saunders et al. |
| 6,014,594 A | 1/2000 | Heidel et al. |
| 6,048,269 A | 4/2000 | Burns et al. |
| 6,056,289 A | 5/2000 | Clapper, Jr. |
| 6,110,044 A | 8/2000 | Stern |

(Continued)

FOREIGN PATENT DOCUMENTS

| | | |
|---|---|---|
| WO | 94/16781 | 8/1994 |
| WO | 98/59311 | 12/1998 |
| WO | 99/22350 | 5/1999 |

*Primary Examiner* — Reginald Renwick
(74) *Attorney, Agent, or Firm* — Gates & Cooper LLP

(57) ABSTRACT

A method, apparatus, article of manufacture, and a memory structure for providing a payout to a player is disclosed. An ATM or ATM-like device is used to cash out of and cash into gaming devices with the player's fingerprint used to securely transfer the cash-in or cash-out data between the gaming device and the ATM. An embodiment is disclosed in which the information is passed between the ATM and the gaming device via a token.

29 Claims, 15 Drawing Sheets

(56) References Cited

U.S. PATENT DOCUMENTS

| | | | |
|---|---|---|---|
| 6,113,492 | A | 9/2000 | Walker et al. |
| 6,128,550 | A | 10/2000 | Heidel et al. |
| 6,170,744 | B1 | 1/2001 | Lee et al. |
| 6,253,119 | B1 | 6/2001 | Dabrowski |
| 6,263,258 | B1 | 7/2001 | Dabrowski |
| 6,280,326 | B1 | 8/2001 | Saunders |
| 6,340,331 | B1 | 1/2002 | Saunders et al. |
| 6,547,664 | B2 | 4/2003 | Saunders |
| 6,558,256 | B1 | 5/2003 | Saunders |
| 6,598,788 | B1 | 7/2003 | Dabrowski |
| 6,612,928 | B1 * | 9/2003 | Bradford et al. ............... 463/29 |
| 6,623,357 | B2 | 9/2003 | Chowdhury |
| 6,650,427 | B2 | 11/2003 | Brooks et al. |
| 6,763,998 | B1 | 7/2004 | Miodunski et al. |
| 7,107,245 | B1 * | 9/2006 | Kowalick ....................... 705/44 |
| 7,147,558 | B2 * | 12/2006 | Giobbi ........................... 463/25 |
| 7,324,973 | B2 * | 1/2008 | Taylor, III ...................... 705/50 |
| 2002/0160832 | A1 | 10/2002 | Burns et al. |
| 2003/0166412 | A1 | 9/2003 | Marcu |
| 2003/0171145 | A1 | 9/2003 | Rowe |
| 2006/0046842 | A1 | 3/2006 | Mattice et al. |

* cited by examiner

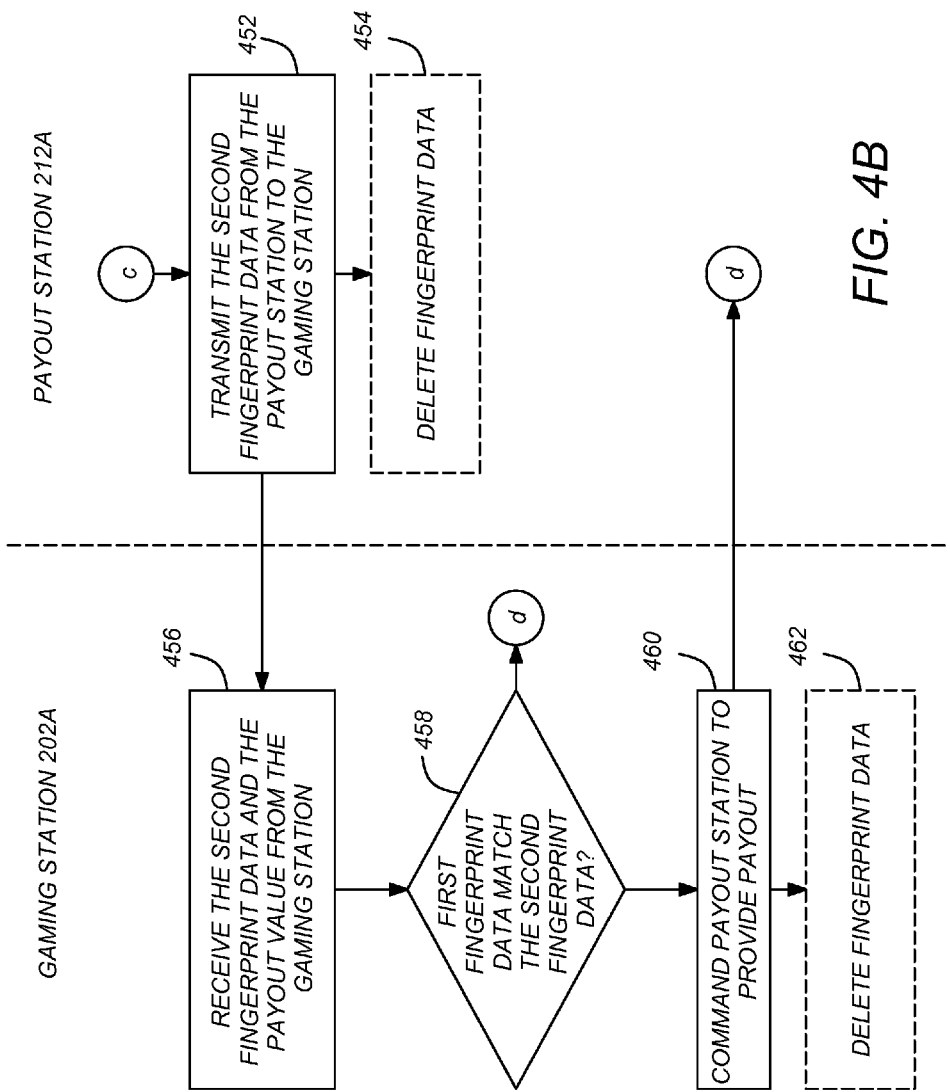

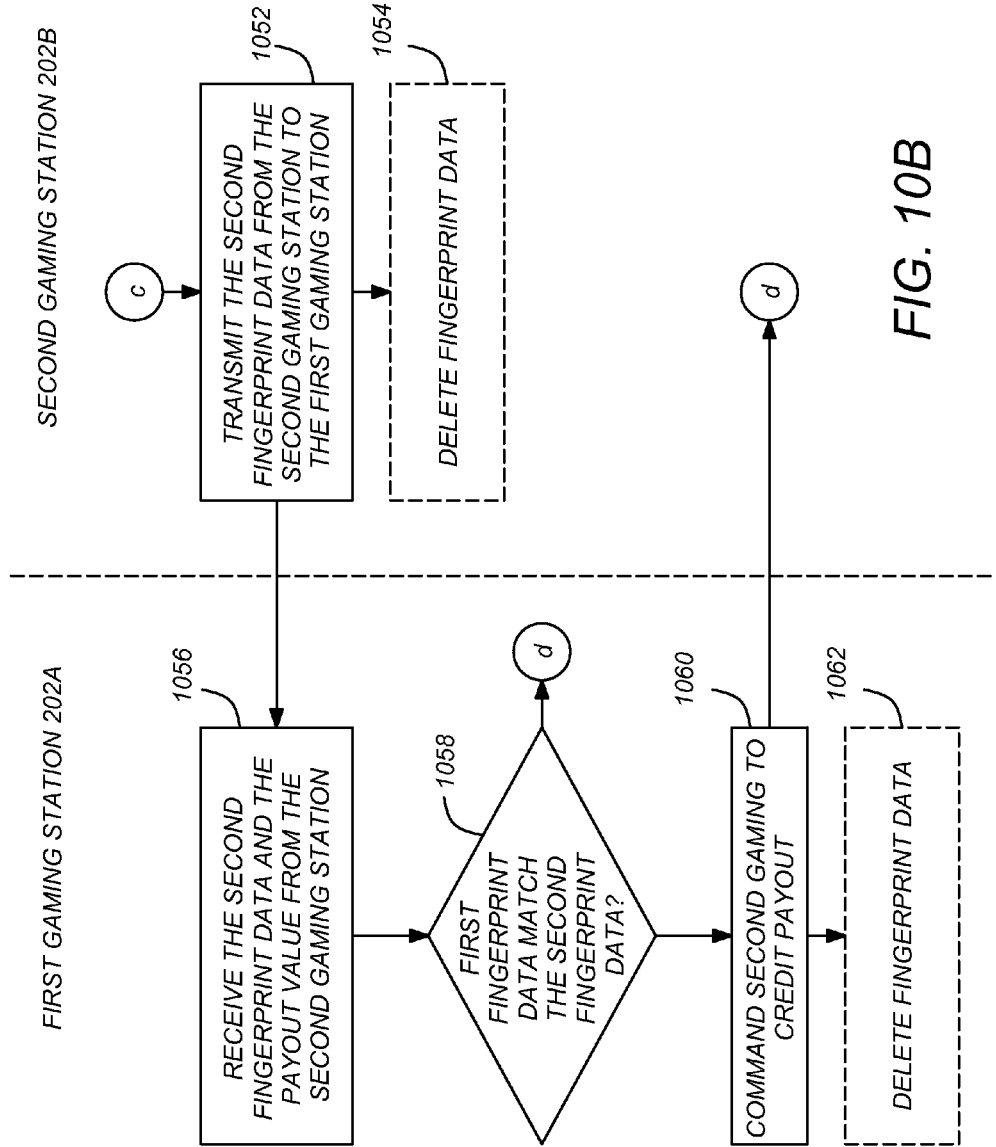

METHOD AND APPARATUS FOR PROVIDING SECURE AND ANONYMOUS CASH-OUT AND CASH-IN VALUES IN A GAMING SYSTEM

CROSS-REFERENCE TO RELATED APPLICATIONS

This application is a continuation of U.S. patent application Ser. No. 11/386,341, entitled "METHOD AND APPARATUS FOR PROVIDING CASH-OUT AND CASH-IN VALUES TO A GAMING DEVICE," by Stanley P. Dabrowski, filed Mar. 22, 2006, issued as U.S. Pat. No. 8,834,264 on Sep. 16, 2014, which application is hereby incorporated by reference herein.

BACKGROUND OF THE INVENTION

1. Field of the Invention

The present invention relates to systems and methods for managing currency transactions in gaming environments, and in particular, to an inexpensive system for securely cashing in and out of a gaming device.

2. Description of the Related Art

Recent years have seen the expansion of the gaming industry, particularly in non-traditional (casino) environments such as bars, convenience stores, and the like. One of the problems associated with such environments involves the management of currency transactions between players and the management of the non-traditional environment.

Traditional gaming devices accepted coins and paid out winnings in coin. Many of these devices were later replaced by gaming machines that accept both bills and coins, and issue payouts in coins.

Because the payback percentage of gaming machines averages less than 100%, the coin and or paper denomination stored in standalone gaming machines must be regularly emptied. Each machine must be monitored to assure that it has sufficient coin/cash/scrip reserves to allow game play. However, the replenish interval can vary widely from machine to machine, due to factors such as the popularity of a particular machine, the location of the machine, the season, and other factors. The effect of these factors becomes especially difficult to determine for new machines. Since the gaming machines are in remote and often widely scattered locations, this involves a considerable effort. It also includes a risk of theft by employees retrieving the funds from the gaming machines, or even worse, robbery of the employees themselves.

At the same time, typical gaming machines are occasionally called to pay out large payouts. Such payouts may well exceed the funds available in the gaming machine itself.

In order to resolve some of these issues, many large casinos have turned to cashless gaming systems. In such systems, when the player cashes out, the gaming device issues a printed token with a manifestation of the cash-out value. The token can be inserted into another gaming device to continue play, or into a redemption machine to receive cash payment for the cash-out value.

While this system works reasonably well in large casinos with many gaming machines, it does not work well in more modest casinos such as those found in gas stations, restaurants, saloons and the like. Such installations do not generally include enough gaming machines to justify cost of a redemption machine. Further, such gaming devices with token printers/dispensers are more expensive to purchase and maintain (printers consume both paper and ink, and even systems with pre-printed tokens, such as that which is illustrated in U.S. Pat. No. 6,598,788, which is hereby incorporated by reference, need to be periodically replenished with pre-printed tokens).

Hence, in small casino applications, some payout systems rely on attendants (who typically have other responsibilities, such as a cashier at a convenience store or gas station) to make or authorize payouts. A system such as this is described in U.S. Pat. No. 6,763,998, which is incorporated by reference herein. It is also possible for the cashier to pay a portion of the cash-out value from cash obtained from one device, and the remainder from the cash register. For example, if the cash-out value is $132.00 and a cash dispensing device will only pay out values in $20 increments, the cash dispensing device may pay out $120.00, and the cashier may pay out the remainder from the cash register).

The interposition of an attendant between the player and the cash-out payment and the use of paper tokens has significant disadvantages. First, as described above, gaming devices that print cash-out tokens are more expensive and must be regularly maintained to replenish paper and ink. They are also prone to failure, and since the printed result itself has monetary value, such failures can require considerable attention on the part of the attendant to resolve. These responsibilities may detract from the attendant's other duties. It also raises the possibility of possible cooperative fraud involving a player and the attendant.

What is needed is a payout system that provides secure cash-out payments in a way that is sufficiently economical and convenient for use in small scale gaming operation. The present invention satisfies that need.

SUMMARY OF THE INVENTION

To address the requirements described above, the present invention discloses a method, apparatus, article of manufacture, and a memory structure for providing a payout to a player. In one embodiment, the method comprises the steps of accepting a cash-out command in a gaming station having a first fingerprint sensor, the cash-out command associated with a payout value, sensing a fingerprint of the player with the first fingerprint sensor, generating first fingerprint data from the fingerprint sensed by the first fingerprint sensor, accepting a payout command in a payout station, sensing the fingerprint of the player with a second fingerprint sensor, generating second fingerprint data from the fingerprint sensed by the second fingerprint sensor, and paying out at least a portion of the payout value at the payout station based at least in part upon a comparison between the first fingerprint data and the second fingerprint data.

In another embodiment, the apparatus comprises a gaming station and a payout station. The gaming station has a first user interface for accepting a cash-out command associated with a payout value and a first fingerprint sensor for sensing a fingerprint of the player to generate first fingerprint data, a first processor, communicatively coupled to the first user interface and the first fingerprint data. The payout station has a second user interface for accepting a payout command, a second fingerprint sensor for sensing the fingerprint of the player to generate second fingerprint data, a dispenser for paying out at least a portion of the payout value at the payout station based at least in part upon a comparison between the first fingerprint data and the second fingerprint data, and a second processor, communicatively coupled to the second user interface, the second fingerprint sensor, and the dispenser. In one embodiment, the payout station comprises a remote transaction device (RTD) such as an automatic teller machine (ATM).

In another embodiment, the present invention is evidenced by a method for providing a cash-in value to a player station. The method comprises the steps of accepting a command in an RTD to access a player asset such as the player's account at a financial institution, selecting a cash-in value, sensing a fingerprint of the player using a first fingerprint sensor communicatively coupled to or integrated with the RTD, generating first fingerprint data from the fingerprint sensed by the first fingerprint sensor, sensing the fingerprint of the player using a second fingerprint sensor communicatively coupled to a gaming device, generating second fingerprint data from the fingerprint sensed by the second fingerprint sensor, and crediting the gaming device with the cash-in value based at least upon a comparison between the first fingerprint data and the second fingerprint data.

In still another embodiment, the invention is evidenced by an automated teller machine (ATM) having a first user interface for accepting a command to access a financial institution account and to select a cash-in value, a first fingerprint sensor, communicatively coupled to the ATM, for sensing a fingerprint of the player to generate first fingerprint data, a second fingerprint sensor, for sensing the fingerprint of the player to generate second fingerprint data, the second fingerprint sensor communicatively coupled to a gaming device, a processor, coupled to the fingerprint sensor, for crediting the gaming device with the cash-in value based at least upon a comparison between the first fingerprint data and the second fingerprint data. The systems described above offer many advantages over the prior art. First, they allow (but do not require) the use of locally available RTD or ATM (or ATM-like device) to cash in or out of a gaming machine. ATMs typically store relatively large sums of money, and the infrastructure for maintaining those stores of cash within acceptable limits are already in place. In addition, when using ATMs to access personal savings accounts, users are less apprehensive about providing their fingerprint, since it further secures their account from unauthorized access. These embodiments of the present invention take advantage of the ATMs large cash supply, existing maintenance infrastructure, user interface, and security devices to allow users to securely cash in and out of a gaming device.

BRIEF DESCRIPTION OF THE DRAWINGS

Referring now to the drawings in which like reference numbers represent corresponding parts throughout:

FIGS. 4A and 4B are flow charts illustrating techniques for sharing fingerprint data for cash-out purposes;

FIGS. 10A and 10B are flow charts illustrating techniques for sharing fingerprint data for cash-out and cash-in purposes;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
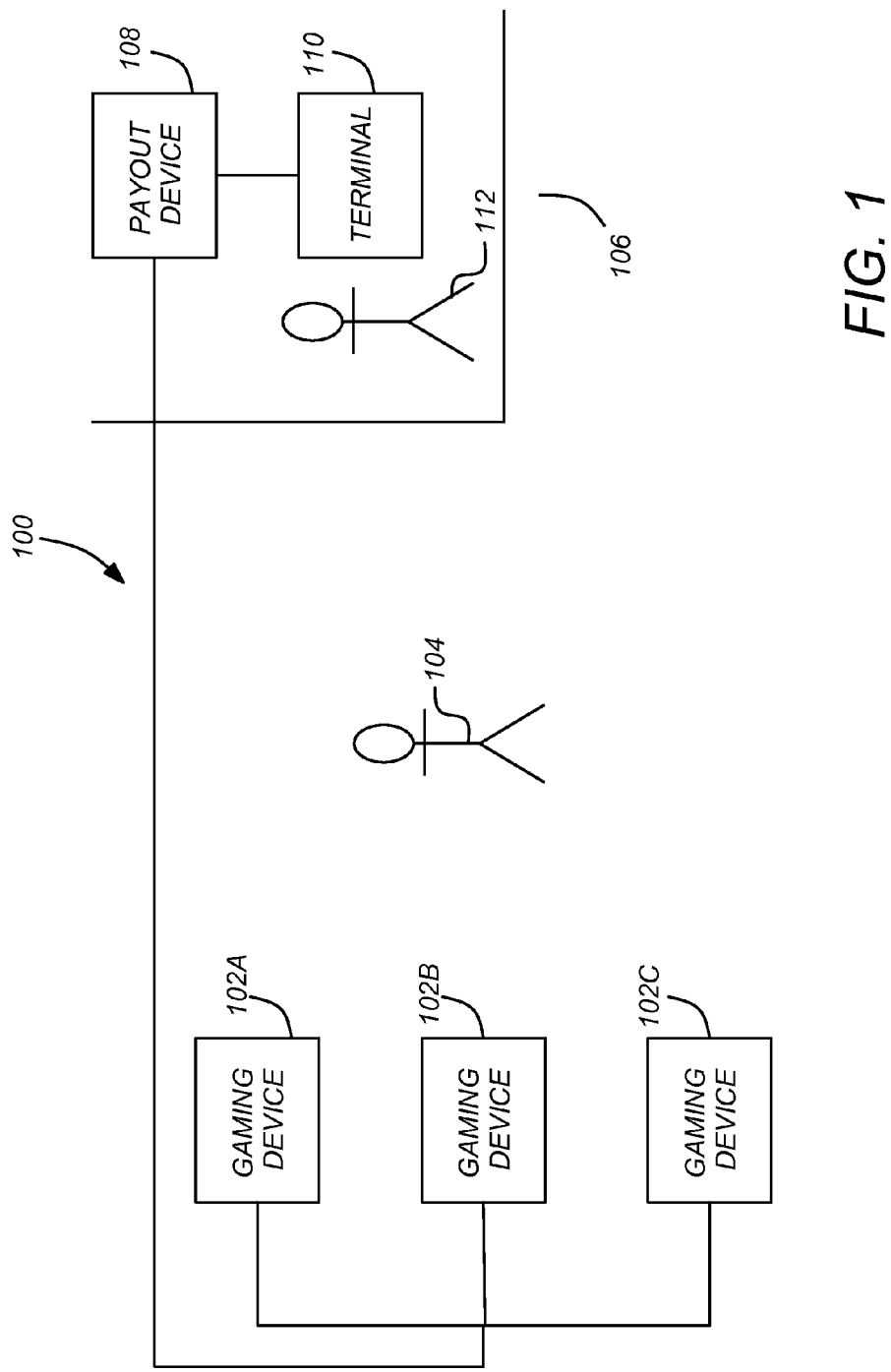
FIG. 1 is a diagram illustrating an exemplary prior art gaming system.

FIG. 1 is a diagram illustrating an exemplary prior art gaming system 100 that might be located in a remote location such as a convenience store or a saloon. The gaming system 100 comprises one or more gaming devices 102A-102C (hereinafter alternatively referred to as gaming device(s) 102). Each of the gaming devices is communicatively coupled to a remote payout device 108 communicatively coupled to a terminal 110. Under control of the terminal 110, the remote payout device 108 which dispenses the player's 104 payout. Typically, the terminal 110 and payout device 108 is not available to the player 104 to receive the payout, as illustrated by barrier 106. Instead, the attendant 112 acts as an intermediary between the player 104 and the payout dispensed by the payout device 108. An example of a prior art gaming system 100 is the system disclosed in U.S. Pat. No. 6,763,998, issued to Miodunski et al., which application is hereby incorporated by reference herein.

Figure 2:
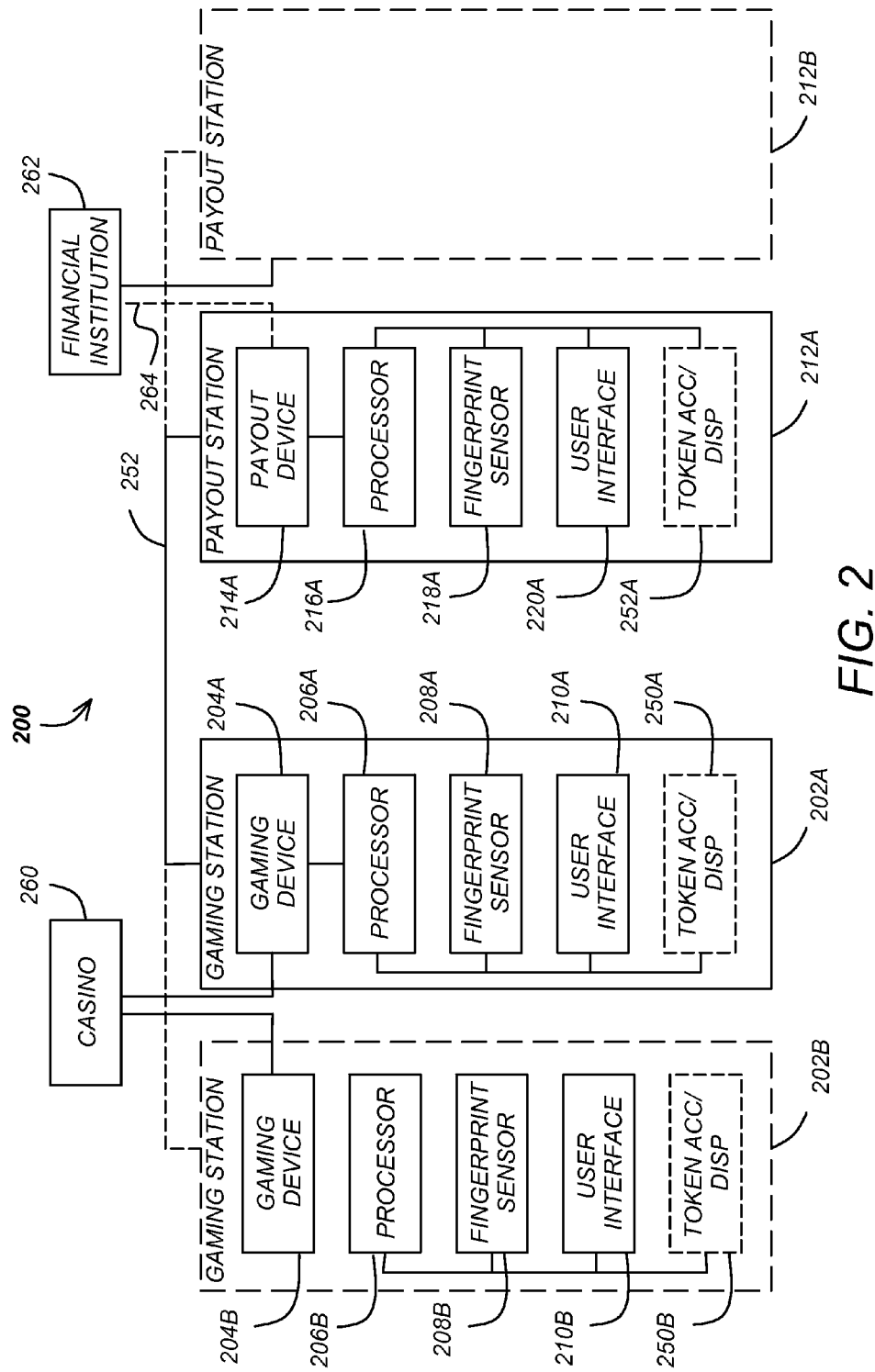
FIG. 2 is a diagram showing an embodiment of a gaming machine payout system.

FIG. 2 is a diagram showing an embodiment of a gaming machine payout system (GMPS) 200. The GMPS 200 comprises one or more gaming stations 202A, 202B (hereinafter, alternatively referred to as payout station(s) 202), and one or more payout stations 212A, 212B (hereinafter, alternatively referred to as payout station(s) 212). In one embodiment of the GMPS 200, the gaming station(s) 202 are communicatively coupled to the payout station(s) 212 via communication medium 252. In this context, the term "communicatively coupled" indicates that the gaming stations and payout stations are configured to be in substantially instantaneous communication with one another. Hence, the communication medium 252 may comprise one or more wires, a wireless link such as infrared (IR) or radio frequency (RF), or a computer network.

Each gaming station 202A, 202B may comprise a gaming device 204A, 204B such as a video poker machine or a slot machine. The gaming device 204A, 204B typically includes it's own processor, display, cash and/or coin acceptance device, and payout device. In one embodiment, the gaming device 204A, 204B is a conventional gaming device that has been modified as described in U.S. Pat. No. 6,379,246, which is hereby incorporated by reference.

The gaming stations 202A, 202B further comprise a processor 206A, 206B, a fingerprint sensor 208A, 208B, a user interface 210A, 210B and an optional token acceptor/dispenser 250A, 210B. The processor 206A, 206B is communicatively coupled to accept data from the fingerprint sensor 208A, 208B, to accept input from and/or provide output to the user interface 210A, 210B, and to control the token acceptor/dispenser 250A, 250B. Typically, the processor 206A, 206B includes or is coupled to a memory storing instructions for performing processor 206A, 206B functions for performing the functions described below. The processor 206A, 206B may also be integrated with the gaming device 204A, 204B (e.g. a single processor performs gaming device 204A, 204B functions as well as the cash-out and cash-in functions described below, which use the fingerprint sensor 208A, 208B, user interface 210A, 210B, and optional token acceptor/dispenser 250A, 250B.

The fingerprint sensor 208A, 208B senses the player's 104 fingerprint as described below, and provides fingerprint data representative of the player's fingerprint to the processor 206A, 206B for processing. The data provided by the fingerprint sensor 208A, 208B may be raw data, or may be processed data. For example, the fingerprint sensor 208A, 208B may compute fingerprint metrics from the player's fingerprint and transmit those metrics to the processor 206A, 208B in lieu of raw data.

The user interface 210A, 210B may include an input device such as a keyboard and an output device such as a cathode ray tube, liquid crystal, or other display. The user interface 210A, 210B accepts input from the player and/or provides output and information to the player as well.

The optional token acceptor/dispenser 250A, 250B dispenses and/or accepts tokens to/from the player 104 as described below. The tokens can comprise any medium capable of storing data, including a printed token, a token having a magnetic stripe, or a solid state memory device such as a flash drive, smart card, and the like.

The gaming device 204A, 204B may also be communicatively coupled to a casino network 260 having other gaming devices.

The payout station 212A comprises a payout device 214A a processor 216A, a fingerprint sensor 218A, a user interface 220A, and an optional token acceptor/dispenser 252A. In one embodiment, the payout device 214A is a cash dispenser that can dispense bills in one or more denominations ($20, $10, $5, and $1 bills). The payout device 214A may also comprise a coin dispenser.

In another embodiment, the payout device 214A comprises an RTD such as an automated teller machine (ATM) communicatively coupled to a financial institution 262 via link 264 to remotely perform financial transactions. In this embodiment, the payout machine 214A generally includes a dedicated user interface that includes a cash acceptor, a cash dispenser, an ATM card reader, a keyboard or keypad, and a display.

The payout device 214A is communicatively coupled to a processor 216A. The processor 216A includes, or is coupled to, a memory storing instructions for performing processor 216A functions. The processor 216A is communicatively coupled to the payout device 214A, the fingerprint sensor 218A, the user interface 220A and the optional token acceptor/dispenser 252A to perform the cash-in and cash-out operations described below. The processor 216A may be integrated with the payout device 214 used to perform payout device 214A functions. Optional payout station 212B comprises components analogous to those of payout station 212B. Also note that the term "payout station" and "payout device" is used above for the sake of convenience. As described herein below, the "payout station" may also be used to "cash in" and credit one of the gaming devices 204A, 204B with the appropriate number of credits as well. Hence, in some embodiments, the "payout station" may also be regarded as a "transaction station" where funds can be obtained and applied to a gaming device or funds from a gaming device may be paid out or applied to an account such as an ATM account at a financial institution.

Figure 3:
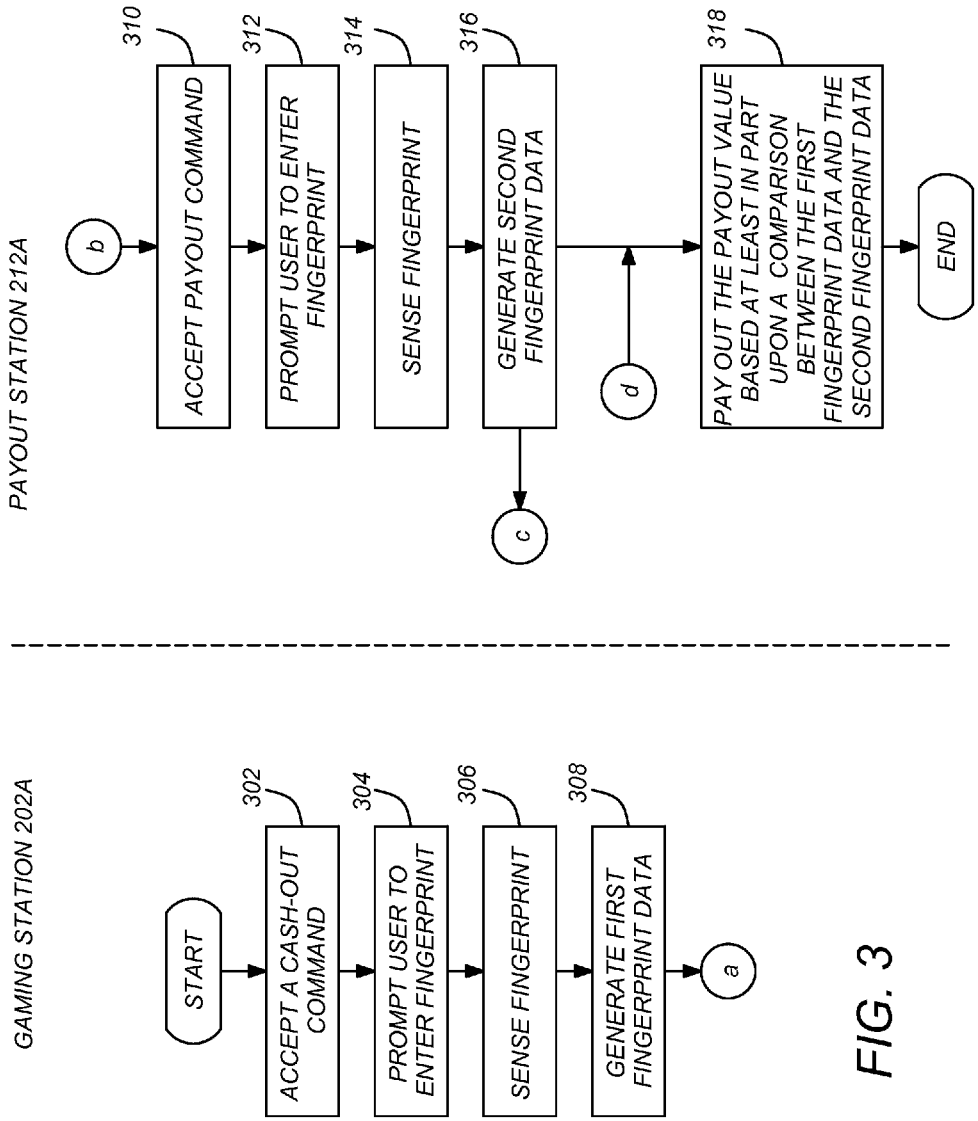
FIG. 3 is a flow chart presenting an illustrative example of how a player may use the GMPS to cash out of a gaming device.

FIG. 3 is a flow chart presenting an illustrative example of how a player 104 may use the GMPS 200 to cash out of a gaming device 204A. In block 302, the gaming station 202A accepts a cash-out command from the player 104. This cash-out command is typically provided using the user interface integrated with the gaming device. The cash-out command is made available to the processor 206 which, using user interface 210A or the user interface integrated with the gaming device 204A, prompts the user to enter their fingerprint by applying their finger or thumb to fingerprint sensor 208A, as shown in block 304. The fingerprint sensor 208A senses the fingerprint of the player 104, as shown in block 306. First fingerprint data is generated from the fingerprint, as shown in block 308. The first fingerprint data may be raw data (e.g. a bitmap of the player's fingerprint), or might comprise fingerprint metric data such as that which is used by law enforcement agencies to compare fingerprint data stored in databases. The translation of the fingerprint data from raw to processed data may also occur in the fingerprint sensor 208A itself (many commercially available devices perform such translations), by the processor 206A, or may be shared between the sensor 208A and the processor 206A.

The player 104 may then leave the gaming station 202A and proceed to the payout station 212A. The player 104 provides a payout command 316 to the payout station 212A, as shown in block 310. This may be accomplished using the user interface included with the payout device 214A, or using user interface 220A. The payout station 212A may prompt the player 104 to enter his/her fingerprint by placing the same finger on the payout station's fingerprint sensor 218A, as shown in block 312, or the player 104 may simply step up and place his/her finger on the fingerprint sensor 218A to start the process, in which case, the entry of the payout command and user prompting are unnecessary.

The payout station 212A then senses the players fingerprint and generates second fingerprint data from the sensed fingerprint, as shown in blocks 314 and 316. The payout station then pays out the payout value based at least in part on a comparison between the first fingerprint data and the second fingerprint data, as shown in block 318. Other data may be used to determine whether to pay out the payout value. For example, the player 104 may be prompted to enter a password when cashing out of the gaming station 202A, and prompted for that same password when attempting to collect the payout from the payout station 212A.

The present invention can be practiced in several embodiments. In a first of such embodiments, the first fingerprint data and payout value is transmitted to the payout station, which compares the first fingerprint data with the second fingerprint data, and based on that comparison made by the payout station 212A, provides the player 104 with the payout. This embodiment requires a communication link between the gaming station 202 and the payout station 212A, and also requires that the first fingerprint data transmitted to and stored in the payout station 212A, at least until the player obtains their payout from the payout station 212A.

In a second embodiment, the second fingerprint data is transmitted to the gaming station 202A, which compares the first and second fingerprint information and commands the payout station 212A to make the payout. This requires that the gaming station 202A at least temporarily store the fingerprint data (until such time that the first and second fingerprint data can be compared), but does not require transmission of fingerprint data to the payout station 212A, nor storage of fingerprint data in the payout station 212A.

In a third "sneaker-net" embodiment, the payout value, fingerprint data and any other information is embodied into a token (such as a paper token with printed data or barcode(s), or a magnetic stripe, a smart card, a flash memory USB token) that the player 104 takes to the payout station 212A. Many people are reluctant to provide their fingerprint for public identification purposes, fearing that the data might be stored and/or used in some nefarious way. This embodiment is advantageous because neither the first or second fingerprint data need be stored by either the gaming station 202A or the payout station 212A, nor is any communication link (e.g. 252) required.

Figure 4A:
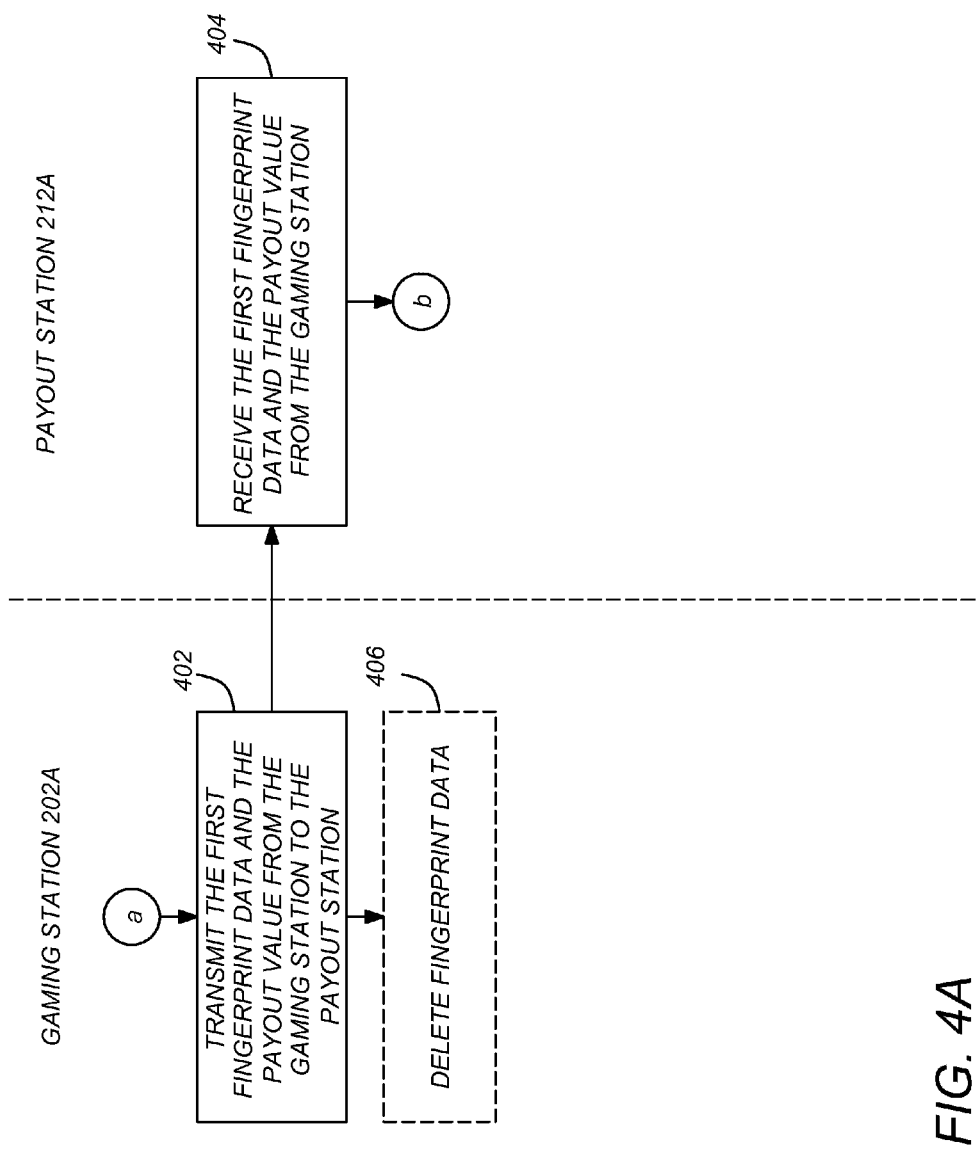

FIG. 4A is a flow diagram illustrating the first embodiment described above. After the gaming station 202A has generated the first fingerprint data (block 308), the gaming station 202A transmits a message having the first fingerprint data and the cash-out (or payout) value to the payout station 212A, as shown in block 402.

Preferably, the fingerprint data and the payout value are encrypted before transmitting them to the payout station 212A. The encryption of the data by the gaming station 202 and the decryption of the encrypted data by the payout station 212A can be accomplished via a shared secret, by public/private key pairs, RSA, or any other method offering adequate security. Being at least somewhat random and unique, the player's fingerprint data itself may be used to encrypt the payload value as well.

The payout station 212A receives and decrypts the message, if necessary, to recover the fingerprint data and payout value, as shown in block 404. Processing then proceeds to block 310. Rather than send the first fingerprint data when it is generated, the data may be sent only upon request from the payout station 212A (e.g. in response to a payout request from the player 104). While this requires the gaming station 202 to temporarily store the fingerprint data, it relieves the payout station 212A from having to do so.

Many people are reluctant to provide fingerprint information. One of the reasons for this reluctance is the suspicion that the fingerprint data will be permanently stored and later transmitted to a remote location external to the GMPS 200, to be used for other purposes. To ameliorate this problem, the gaming station 202A can be designed so that the fingerprint data from the fingerprint sensor 208A is not stored in any permanent or semi-permanent way in the gaming station or the payout station 212A. This can be accomplished by accepting the fingerprint data only into a circular buffer (preferably with a size greater than, but approximating the size required to store the fingerprint data) and transmitting that data directly to the payout station without storing it elsewhere. It can also be accomplished by storing the data in a solid state, optical, or magnetic memory that erased or written over as soon as it is transmitted to the payout station and no longer needed. Block 406 shows this process.

FIG. 4B is a flow diagram illustrating the second embodiment described above. In this embodiment, the first fingerprint data is not transmitted from the gaming station 202A to the payout station 212A, but instead, the second data is transmitted from the payout station 212A to the gaming station 202A for comparison. Referring to FIG. 3, after the second fingerprint data is generated as shown in block 316, the second fingerprint data is transmitted from the payout station 212A to the gaming station 202A. At this point, since the comparison between the first and second fingerprint data is to be accomplished by the gaming station 202A, the fingerprint data can be deleted, as shown in block 454. As was the case in the embodiment of FIG. 4A, the communications between the payout station and gaming station can be encrypted.

The gaming station 202A receives the second fingerprint data, and compares the first and second fingerprint data to determine if they match. If they match, a message is sent to the payout station 212A to provide the payout, as shown in blocks 458 and 460. The message may include the payout value and be encrypted as well. If they do not match, a message indicating that no payout will be made may be sent to the payout station 212A. Once the payout has occurred, the first and second fingerprint data can be deleted, as shown in block 462. Logic returns to block 318, which describes paying out the payout value based on a comparison (in this case, performed by the gaming station 202A) between the first fingerprint data and the second fingerprint data.

Figure 5:
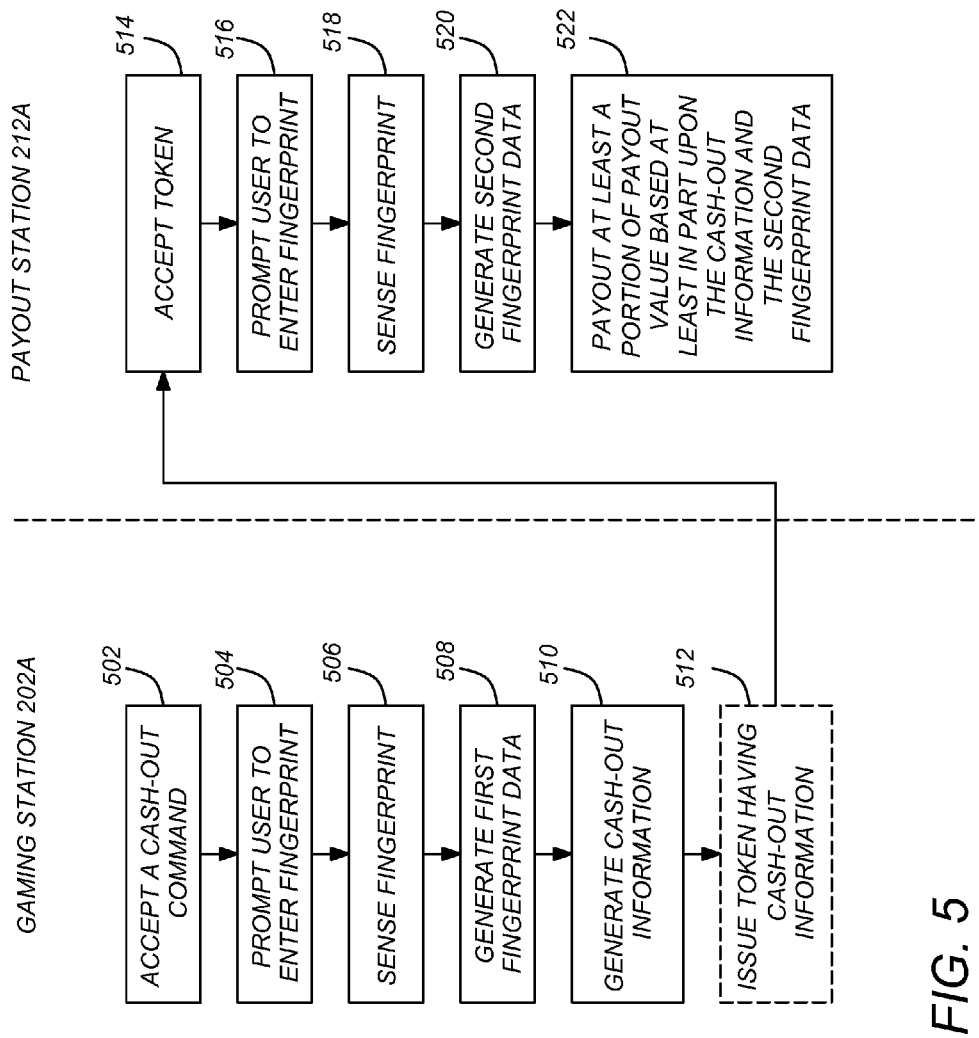
FIG. 5 is a flow chart illustrating the use of a token to share fingerprint data.

FIG. 5 presents a flow diagram illustrating the third embodiment, in which the fingerprint data and payout data are provided to the from the gaming station 202A to the payout station 212A via a token. Using the interface in the gaming device 204A or the user interface 210A of the gaming station 202A, the player 104 enters a cash-out command, which is accepted by the gaming station 202A as shown in block 502. The user is prompted to enter their fingerprint, as shown in block 504. The fingerprint sensor 208A senses the fingerprint as shown in block 506, and first fingerprint data is generated, as shown in blocks 508. This first fingerprint data may be generated by the fingerprint sensor 208A itself, by the processor 206A or by a processor inherent to the gaming device 204A upon receipt of the sensed fingerprint.

Cash-out information, which includes the payout and the first fingerprint data, is generated as shown in block 510 and a token having the cash-out information is issued with the token acceptor/dispenser 250A, as shown in block 512.

The player 104 removes the token and brings it to the payout station 212A. The player provides the token for input into the payout station 212A. The payout station 212A accepts the token (e.g. using the token acceptor/dispenser 252A of the payout station 212A), and prompts the user to enter their fingerprint, as shown in blocks 514 and 516. The fingerprint sensor 218A senses the fingerprint, and second fingerprint data is generated, as shown in blocks 518 and 520. Next, at least a portion of the payout is made based upon the cash-out information and the second fingerprint data, as shown in block 522.

In one embodiment, the cash-out information may comprise the separate fingerprint and payout information, either or both of which can be encrypted before the gaming station 202A records the data on the token. The payout station 208A, using a shared secret or a private/public key paradigm, decrypts the payout and first fingerprint information, compares the first and second fingerprint data, and issues the required payout based on that comparison.

If desired, first fingerprint data and the payout value can be combined to form the cash-out information. For example, the payout value may be hashed or otherwise processed with the fingerprint data to create the cash-out information. Then, the second fingerprint data obtained at the payout station 208 can be used to recover the payout value from the token, essentially using the player's fingerprint as a shared secret. For additional security, the fingerprint and/or the payout value may be encrypted before being combined, using a secret shared between the gaming station and the payout station, or public/private key pairs.

The embodiment shown in FIG. 5 has a number of particular advantages. First, the gaming station 202A and the payout station 212A need not be communicatively coupled to one another to share information. Instead, the information is shared through a token issued to the player 104. Second, since the fingerprint data (or some form of it) is stored by the token, there is no need to store the fingerprint data in either the gaming station 202A or the payout station 212A. As described above, appropriately sized buffers can be used to temporarily store fingerprint data so that computations and other necessary operations may be performed, but so that the buffered storage overwritten by other data entering the buffer.

Figure 6:
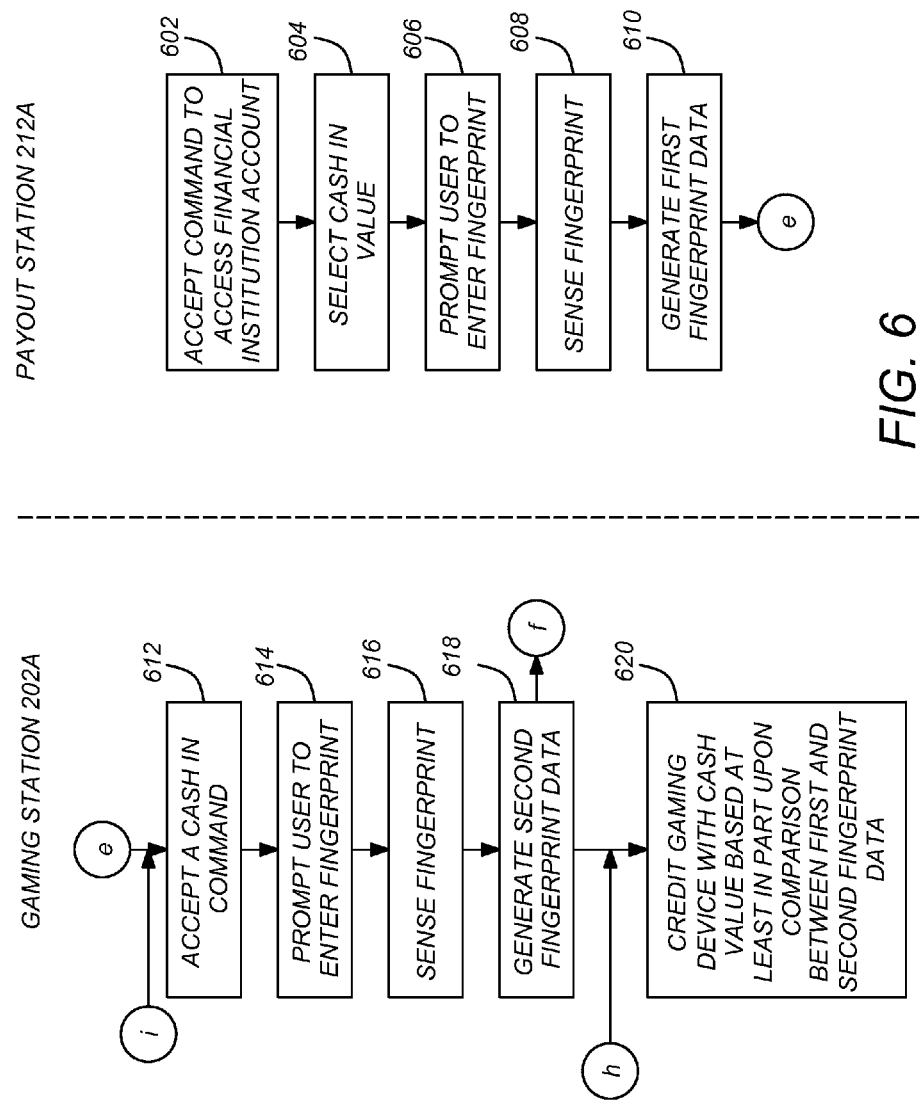
FIG. 6 is a drawing illustrating how the GMPS can be used to allow the player to use the payout station to cash into a gaming station.

FIG. 6 is a drawing illustrating how the GMPS 200 can be used to allow the player 104 to use the payout station 212A to cash into a gaming station 202A (instead of cashing out, as described above). The player 104 approaches the payout station 212A and issues a command to access their account in a financial institution 262. Typically, this involves the insertion of a device such as an ATM card into the user interface of the payout device 214A (in this example, hereinafter referred to as the RTD or ATM), the entry of a suitable password, and navigation of a menu using the user interface of the ATM 214A. The player 104 then selects a desired cash-in value, as shown in block 604. In one embodiment, the user may also indicate which gaming station 202A the user would like to play. The payout station 212A may then reserve that gaming station (e.g. by disabling that gaming station 202 from play for any other person. The payout station 212A prompts the user to enter their fingerprint 606, senses the fingerprint 608, and generates first fingerprint data 610.

The player 104 then moves to the gaming station 202A, and provides a cash-in command which the gaming station 202A accepts, as shown in block 612. The gaming station prompts the player 104 to enter their fingerprint, as shown in block 614. The player 104 places their finger on the fingerprint sensor 208A, and the fingerprint sensor 208A senses the fingerprint, as shown in block 616. Second fingerprint data is then generated from the sensed fingerprint, as shown in block 618. This can be accomplished by the fingerprint sensor 208A or the processor 206A. The gaming device 202A is credited with the cash-in value selected in block 604 based upon a comparison between the first and second fingerprint data.

It may occur that the player 104 changes their mind after entering their fingerprint and decides not to play at any of the gaming stations 202. If this happens, the player may then simply return to the payout station 212A, enter their fingerprint. The payout station 212 compares the new fingerprint with the stored fingerprint, and if the two match, the player 104 is provided with a number of options, including crediting the cash-in value back into their to their account.

As was the case with the cash-out embodiments, there are several ways by which the fingerprint data and the cash-in value may be provided so as to enable the comparison and credit operations shown in block 620.

Figure 7A:
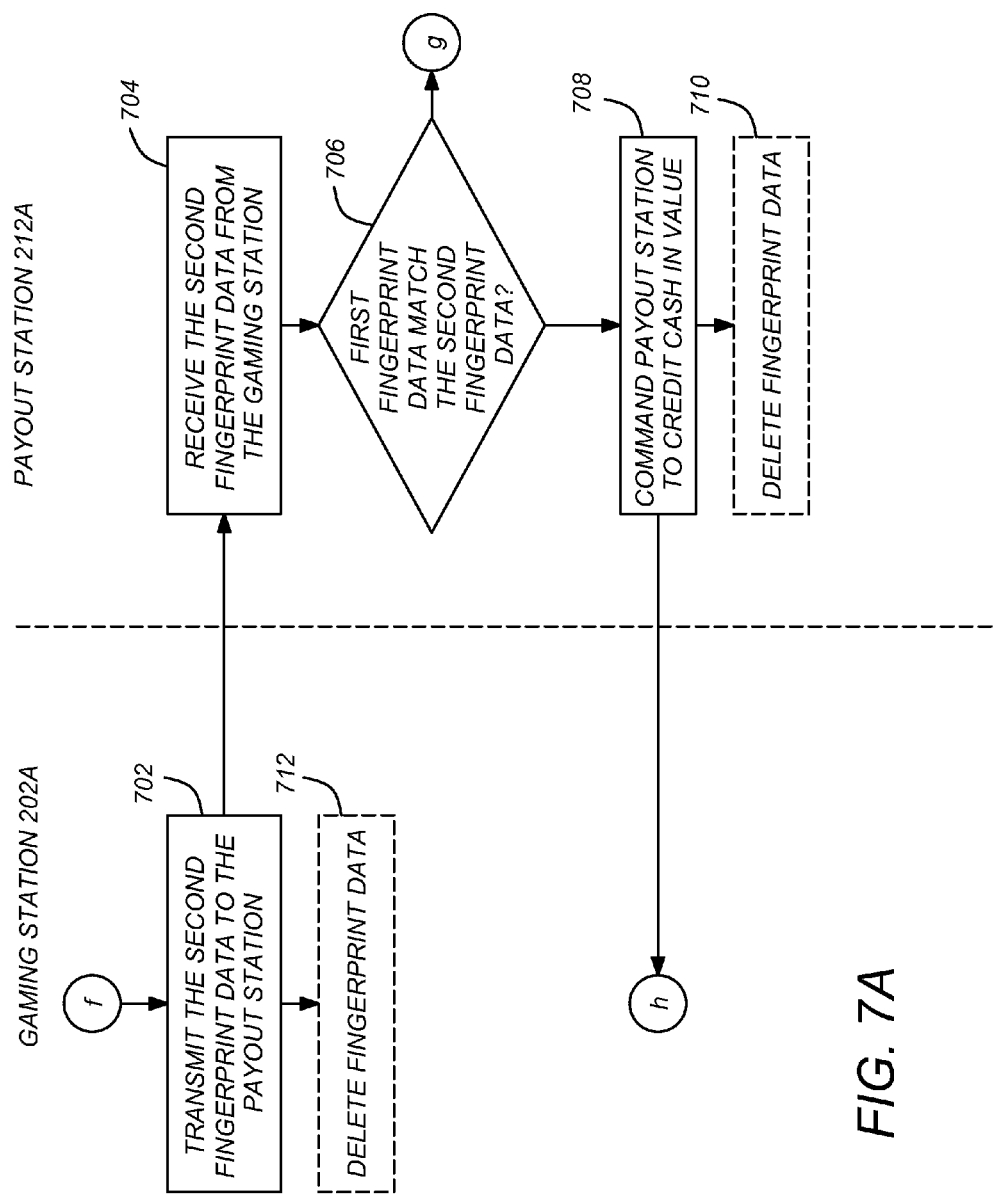
FIGS. 7A and 7B are flow charts illustrating how the cash-in value may be provided from the payout station to the gaming station.

FIG. 7A illustrates an exemplary embodiment of how the cash-in value may be provided from the payout station 212A to one of the gaming stations 202A, 202B (in this case, gaming station 202A). In this embodiment, the player 104 has already used the payout station 212A to enter their fingerprint. The player 104 then goes to the gaming station 202A, provides a cash-in command 612 and enters their fingerprint, as shown in blocks 612-616. The gaming station 202A generates second fingerprint data and logic moves to block 702 of FIG. 7A, which illustrates the transmission of the second fingerprint data to the payout station 212A. The payout station 212A receives the second fingerprint data and compares it to the first fingerprint data to determine if there is a match (the data are close enough to declare that they are from the same person with adequate certainty). If not, processing stops and a message may be sent to the gaming station 202 if desired. If a sufficient match is found, the payout station is commanded to credit the cash-in value, as shown in block 708. Of course, as was described above, the foregoing communications are preferably encrypted. Finally, the fingerprint data stored in the payout station 212A and/or the gaming station 202A can be deleted, as shown in blocks 710 and 712.

Figure 7B:
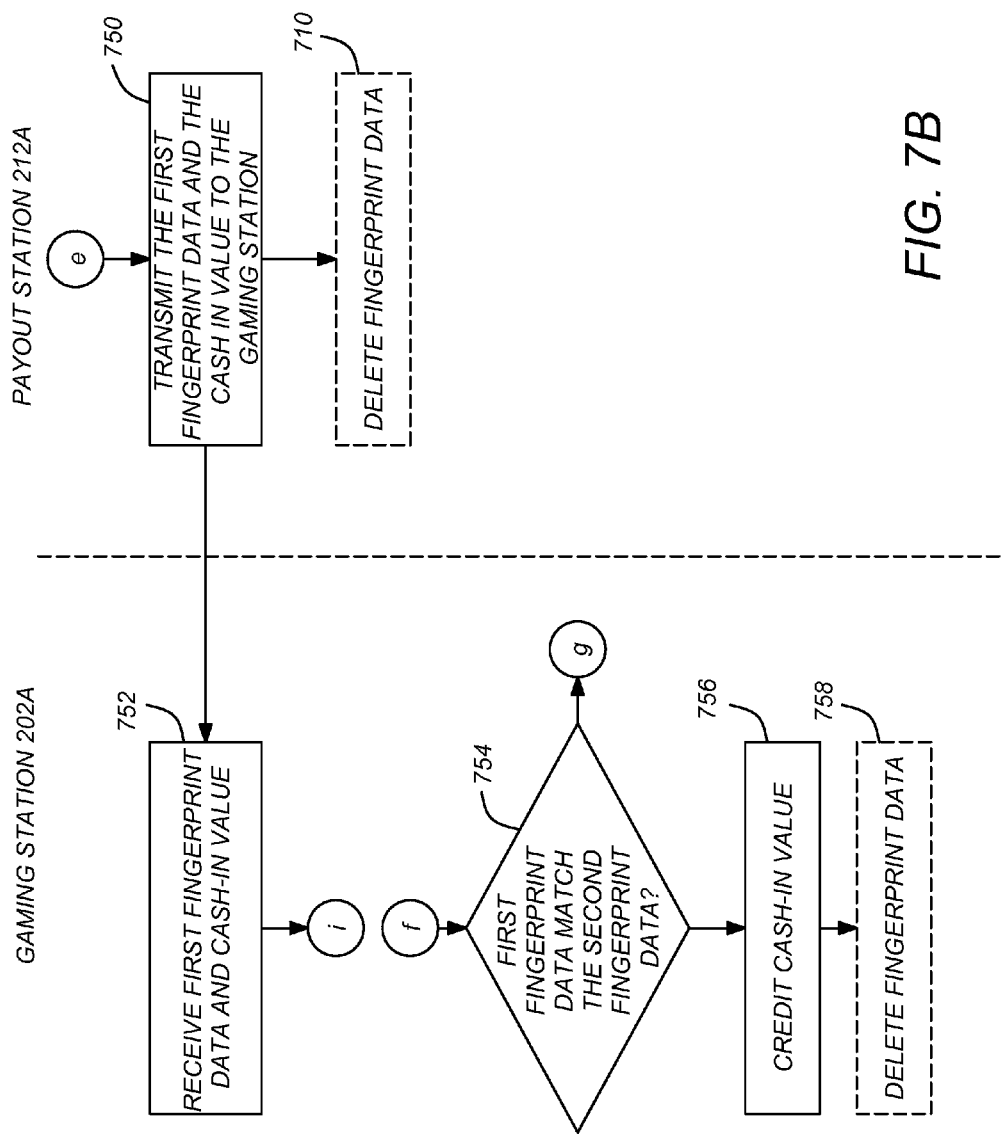

FIG. 7B illustrates another exemplary embodiment of how the cash-in value may be provided from the payout station 212A to one of the gaming stations 202A, 202B (in this case, gaming station 202A). In this embodiment, the player has already used the payout station 212A to enter their fingerprint. Beginning in block 750, the first fingerprint data is transmitted to the gaming station 202.

In one embodiment, the first fingerprint data is sent only to a gaming station 202 that was identified earlier (for example, when the player 104 enters the cash-in value, they may also enter which payout station 212A they would like to play). In this embodiment, when the player 104 cashes in to a selected gaming station 202A, the selected gaming station 202A is locked so that no other player can play it until the player 104 cashes in. Of course, to prevent a player 104 from reserving a machine for an inordinate period of time, the payout station may release the gaming station 202A after a period of time, an re-credit the player's account. Or, the player's account may only be debited when the credit has been applied to the gaming machine 202A and accepted by entering the cash-in command and fingerprint.

Next, the gaming station 202A receives the first fingerprint data and the cash-in value, and transfers flow to block 612 of FIG. 6. After the second fingerprint data is generated, it is checked to see if it sufficiently matches the first fingerprint data in block 754. If it does, the cash-in value is credited to the gaming machine 202 and the player 104 can commence play. Any fingerprint data stored in the gaming station 202A and payout station 212A can be deleted after they are no longer required.

Figure 8:
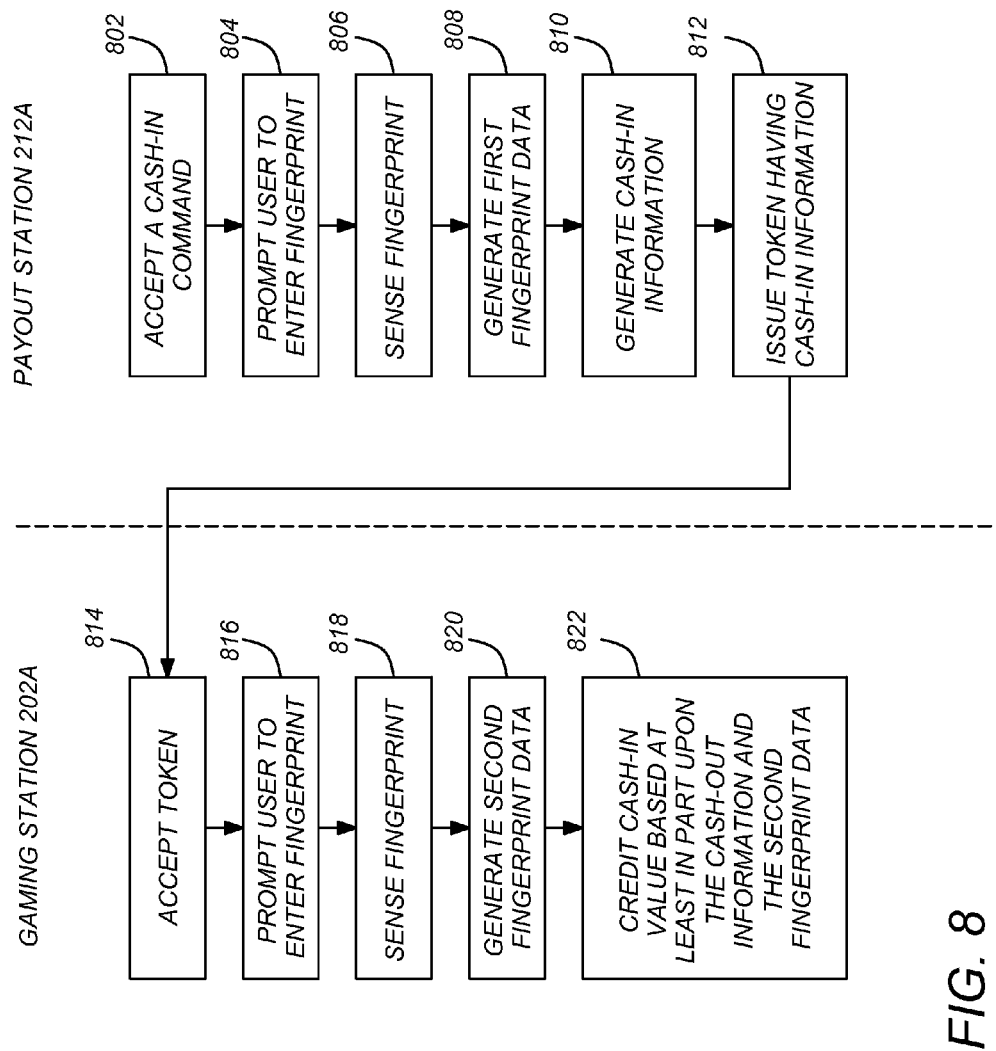
FIG. 8 is a flow chart illustrating the use of a token to share fingerprint data for cash-in purposes.

FIG. 8 is a diagram illustrating another exemplary embodiment of how the cash-in value may be provided from the payout station 212 to the gaming station 202. In this embodiment, the first fingerprint and cash-in information are stored on a token. The cash-in command is received in the payout station, as shown in block 802. The user is prompted to enter a fingerprint, the entered fingerprint is sensed, and cash-in information is generated from the first fingerprint data, as shown in blocks 810. The cash-in data includes the cash-in value and first fingerprint data. This data can be combined and/or encrypted and/or secured with a password as described above with respect to the cash-out data.

The player 104 takes the token to the gaming machine of their choice, and inserts the token into the token acceptor/dispenser 250A. The gaming station 202A accepts the token, optionally prompts the user to enter their fingerprint, senses the entered fingerprint, and generates second fingerprint data, as shown in blocks 814-820. If the first and second fingerprint data sufficiently match, the cash-in value is credited to the gaming station 202A and the player 104 can begin play.

Processors 206A, 216A may be special purpose processors or may be implemented by a computer system.

Figure 9:
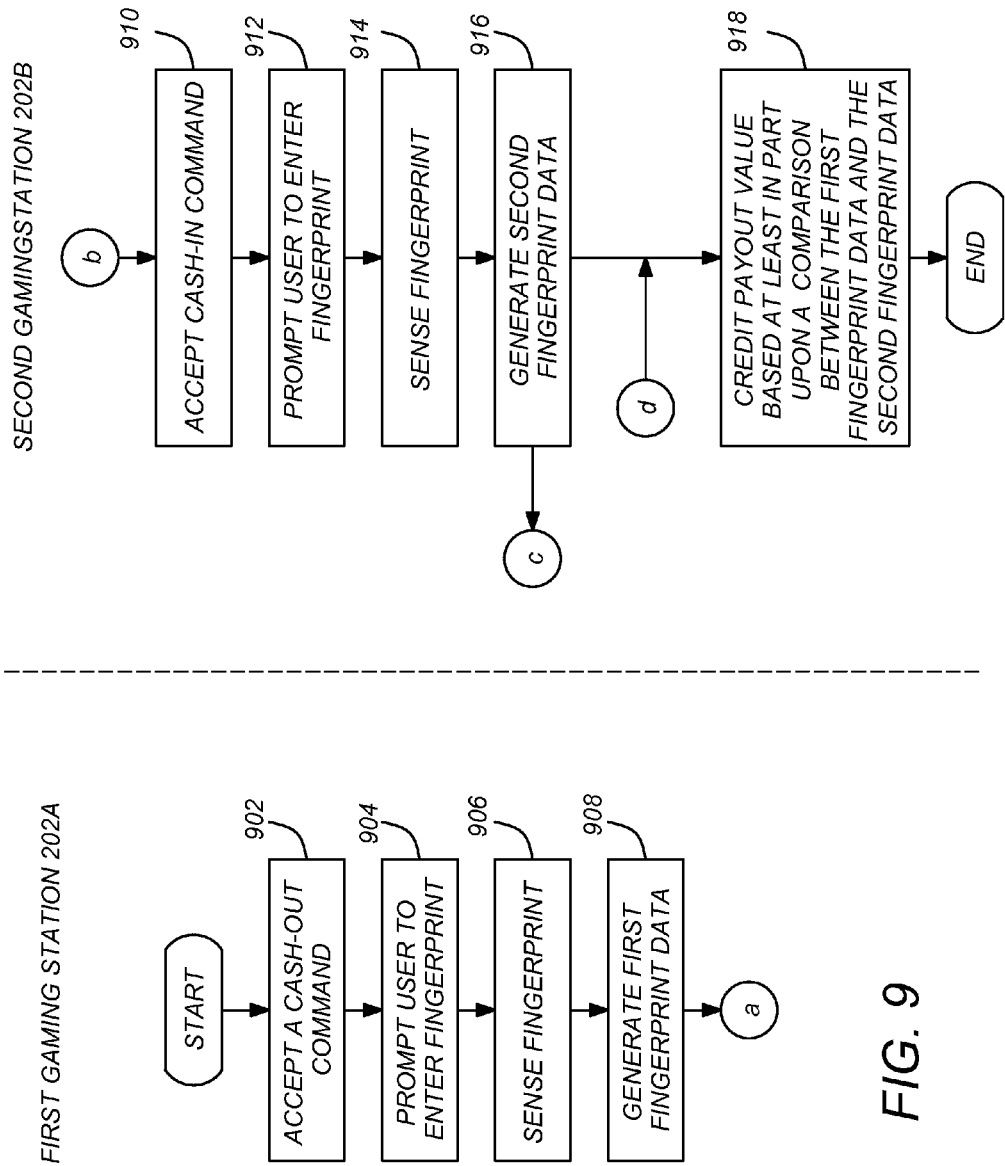
FIG. 9 is a flow chart presenting an illustrative example of how a player may use the GMPS to cash out of a gaming device and cash in to another.

FIG. 9 is a flow chart presenting an illustrative example of how a player 104 may use the GMPS 200 to transfer the credits from a first gaming station 202A to a second gaming station 202B. In block 902, the gaming station 202A accepts a cash-out command from the player 104. This cash-out command is typically provided using the user interface integrated with the gaming device. The cash-out command is made available to the processor 206A which, using user interface 210A or the user interface integrated with the gaming device 204A, prompts the user to enter their fingerprint by applying their finger or thumb to fingerprint sensor 208A, as shown in block 904. The fingerprint sensor 208A senses the fingerprint of the player 104, as shown in block 906. First fingerprint data is generated from the fingerprint, as shown in block 908. The first fingerprint data may be raw data (e.g. a bitmap of the player's fingerprint), or might comprise fingerprint metric data such as that which is used by law enforcement agencies to compare fingerprint data stored in databases. The translation of the fingerprint data from raw to processed data may also occur in the fingerprint sensor 208A itself (many commercially available devices perform such translations), by the processor 206A, or may be shared between the sensor 208A and the processor 206A.

The player 104 may then leave the first gaming station 202A and proceed to the second gaming station 202B. The player 104 provides a cash-in command to the second gaming station 202B, as shown in block 910. This may be accomplished using user interface 210B. The second gaming station 202B may prompt the player 104 to enter his/her fingerprint by placing the same finger on the fingerprint sensor 208B, as shown in block 912, or the player 104 may simply step up and place his/her finger on the fingerprint sensor 208B to start the process, in which case, the entry of the cash-in command and user prompting are unnecessary.

The second gaming station 202B then senses the players fingerprint and generates second fingerprint data from the sensed fingerprint, as shown in blocks 914 and 916. The second gaming station 202B then credits the payout value to the second gaming station 202B based at least in part on a comparison between the first fingerprint data and the second fingerprint data, as shown in block 918. Other data may be used to determine whether to pay out the payout value. For example, the player 104 may be prompted to enter a password when cashing out of the gaming station 202A, and prompted for that same password when attempting to collect the cash into the second gaming station 202B.

The present invention can be practiced in several embodiments. In a first of such embodiments, the first fingerprint data and payout value is transmitted to the second gaming station 202B, which compares the first fingerprint data with the second fingerprint data, and based on that comparison made by the second gaming station 202B, provides credits the payout value to the second gaming station 202B. This embodiment requires a communication link between the gaming station 202 and the second gaming station 202B, and also requires that the first fingerprint data transmitted to and stored in the second gaming station 202B, at least until the player successfully transfers the credits to the second gaming station 202B.

In a second embodiment, the second fingerprint data is transmitted from the second gaming station 202B to the first gaming station 202A, which compares the first and second fingerprint information and commands the second gaming station 202B to provide the credits. This requires that the first gaming station 202A at least temporarily store the fingerprint data (until such time that the first and second fingerprint data can be compared), but does not require transmission of fingerprint data to the second gaming station 202B, nor storage of fingerprint data in the second gaming station 202B.

In a third "sneaker-net" embodiment, the payout value, fingerprint data and any other information is embodied into a token (such as a paper token with printed data or barcode(s), or a magnetic stripe, a smart card, a flash memory USB token) that the player 104 takes to the second gaming station 202B. Many people are reluctant to provide their fingerprint for public identification purposes, fearing that the data might be stored and/or used in some nefarious way. This embodiment is advantageous because neither the first or second fingerprint data need stored by either the first gaming station 202A or the second gaming station 202B, nor is any communication link (e.g. 252) required.

Figure 10A:
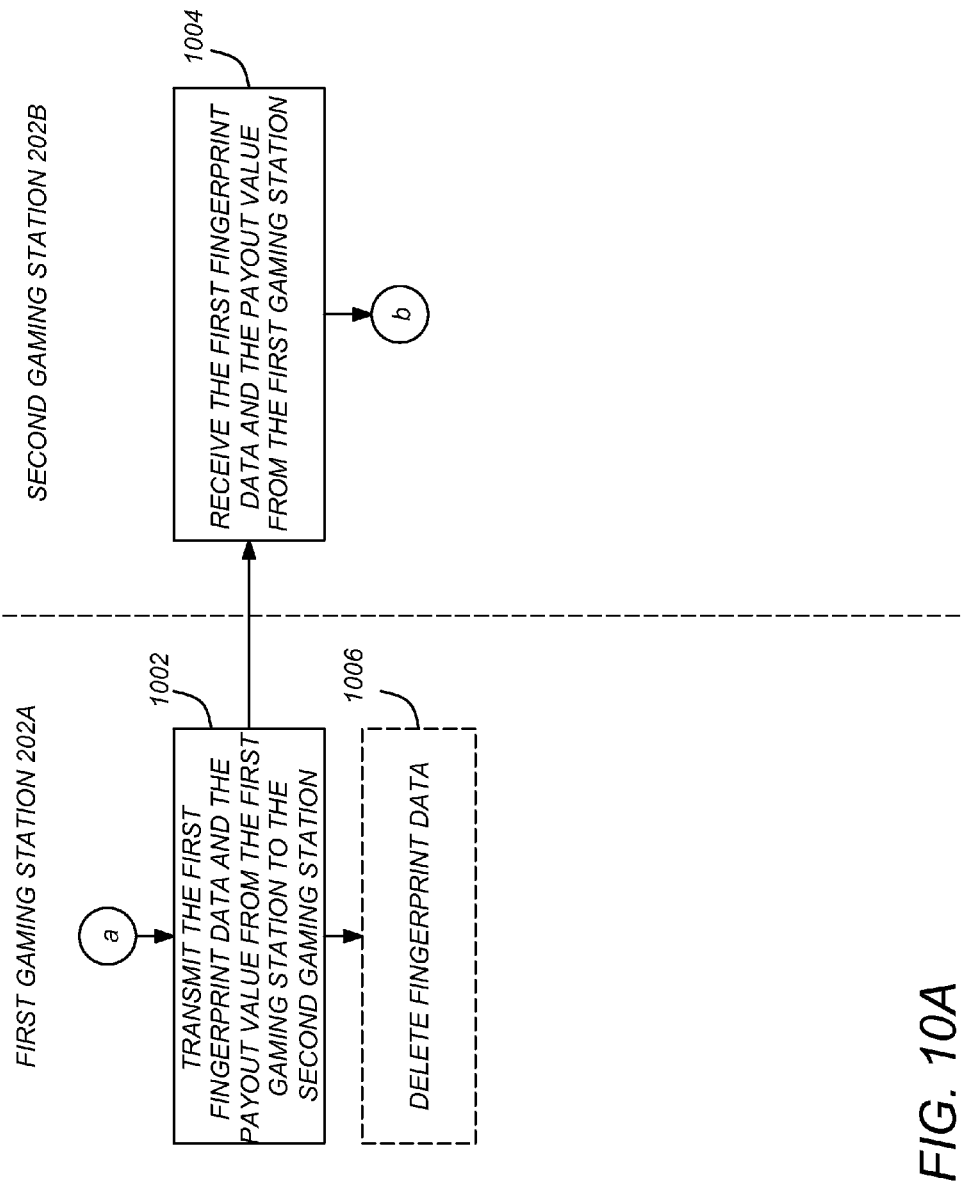

FIG. 10A is a flow diagram illustrating the first embodiment described above. After the first gaming station 202A has generated the first fingerprint data (block 908), the gaming station 202A transmits a message having the first fingerprint data and the cash-out (or payout) value to the second gaming station 202B, as shown in block 1002.

Preferably, the fingerprint data and the payout value are encrypted before transmitting them to the second gaming station 202B. The encryption of the data by the first gaming station 202A and the decryption of the encrypted data by the second gaming station 202B can be accomplished via a shared secret, by public/private key pairs, RSA, or any other method offering adequate security. Being at least somewhat random and unique, the player's fingerprint data itself may be used to encrypt the payload value as well.

The second gaming station 202B receives and decrypts the message, if necessary, to recover the fingerprint data and payout value as shown in block 1004. Processing then proceeds to block 910. Rather than send the first fingerprint data when it is generated, the data may be sent only upon request from the second gaming station 202B (e.g. in response to a cash-in request from the player 104). While this requires the first gaming station 202 to temporarily store the fingerprint data, it relieves the second gaming station 202B from having to do so.

Many people are reluctant to provide fingerprint information. One of the reasons for this reluctance is the suspicion that the fingerprint data will be permanently stored and later transmitted to a remote location external to the GMPS 200, to be used for other purposes. To ameliorate this problem, the first gaming station 202A can be designed so that the fingerprint data from the fingerprint sensor 208A is not stored in any permanent or semi-permanent way in the gaming station or the second gaming station 202B. This can be accomplished by accepting the fingerprint data only into a circular buffer (preferably with a size greater than, but approximating the size required to store the fingerprint data) and transmitting that data directly to the payout station without storing it elsewhere. It can also be accomplished by storing the data in a solid state, optical, or magnetic memory that is erased or written over as soon as it is transmitted to the payout station and no longer needed. Block 1006 shows this process.

FIG. 10B is a flow diagram illustrating the second embodiment described above. In this embodiment, the first fingerprint data is not transmitted from the first gaming station 202A to the second gaming station 202B, but instead, the second data is transmitted from the second gaming station 202B to the first gaming station 202A for comparison. Referring to FIG. 9, after the second fingerprint data is generated as shown in block 916, the second fingerprint data is transmitted from the second gaming station 202B to the first gaming station 202A. At this point, since the comparison between the first and second fingerprint data is to be accomplished by the first gaming station 202A, the fingerprint data can be deleted, as shown in block 1054. As was the case in the embodiment of FIG. 10A, the communications between the payout station and gaming station can be encrypted.

The first gaming station 202A receives the second fingerprint data, and compares the first and second fingerprint data to determine if they match. If they match, a message is sent to the second gaming station 202B to provide the credits, as shown in blocks 1058 and 1060. The message may include the payout value and be encrypted as well. If they do not match, a message indicating that the payout value will not be credited may be sent to the second gaming station 202B. Once the payout has occurred, the first and second fingerprint data can be deleted, as shown in block 1062. Logic returns to block 918, which describes crediting the payout value based on a comparison (in this case, performed by the first gaming station 202A) between the first fingerprint data and the second fingerprint data.

Figure 11:
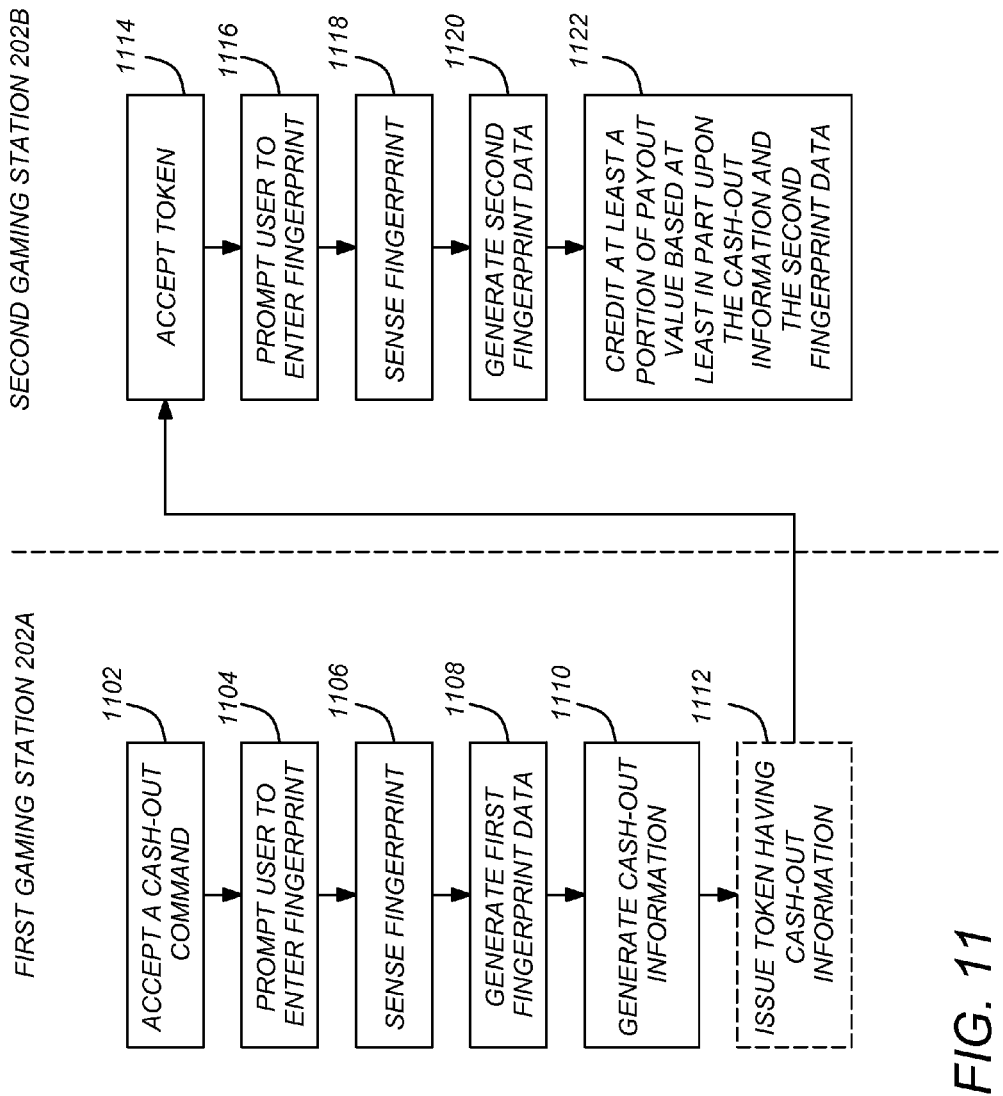
FIG. 11 is a flow chart illustrating the use of a token to share fingerprint data.

FIG. 11 presents a flow diagram illustrating the third embodiment, in which the fingerprint data and payout data are provided to the from the first gaming station 202A to the second gaming station 202B via a token. Using the interface in the first gaming device 204A or the user interface 210A of the gaming station 202A, the player 104 enters a cash-out command, which is accepted by the gaming station 202A as shown in block 1102. The user is prompted to enter their fingerprint, as shown in block 1104. The fingerprint sensor 208A senses the fingerprint as shown in block 1106, and first fingerprint data is generated, as shown in block 1108. This first fingerprint data may be generated by the fingerprint sensor 208A itself, by the processor 206A or by a processor inherent to the gaming device 204A upon receipt of the sensed fingerprint.

Cash-out information, which includes the payout and the first fingerprint data, is generated as shown in block 1110 and a token having the cash-out information is issued with the token acceptor/dispenser 250A, as shown in block 1112.

The player 104 removes the token and brings it to the second gaming station 202B. The player provides the token for input into the second gaming station 202B. The second gaming station 202B accepts the token (e.g. using the token acceptor/dispenser 250B of the second gaming station 202B), and prompts the user to enter their fingerprint, as shown in blocks 1114 and 1116. The fingerprint sensor 208B senses the fingerprint, and second fingerprint data is generated, as shown in blocks 1118 and 1120. Next, at least a portion of the payout value s credited based upon the cash-out information and the second fingerprint data, as shown in block 1122.

In one embodiment, the cash-out information may comprise the separate fingerprint and payout information, either or both of which can be encrypted before the first gaming station 202A records the data on the token. The second gaming station 202B, using a shared secret or a private/public key paradigm, decrypts the payout and first fingerprint information, compares the first and second fingerprint data, and issues the required payout based on that comparison.

If desired, first fingerprint data and the payout value can be combined to form the cash-out information. For example, the payout value may be hashed or otherwise processed with the fingerprint data to create the cash-out information. Then, the second fingerprint data obtained at the second gaming station 202B can be used to recover the payout value from the token, essentially using the player's fingerprint as a shared secret. For additional security, the fingerprint and/or the payout value may be encrypted before being combined, using a secret shared between the gaming station and the payout station, or public/private key pairs.

The embodiment shown in FIG. 5 has a number of particular advantages. First, the first gaming station 202A and the second gaming station 202B need not be communicatively coupled to one another to share information. Instead, the information is shared through a token issued to the player 104. Second, since the fingerprint data (or some form of it) is stored by the token, there is no need to store the fingerprint data in either the first gaming station 202A or the second gaming station 202B. As described above, appropriately sized buffers can be used to temporarily store fingerprint data so that computations and other necessary operations may be performed, but so that the buffered storage overwritten by other data entering the buffer.

Figure 12:
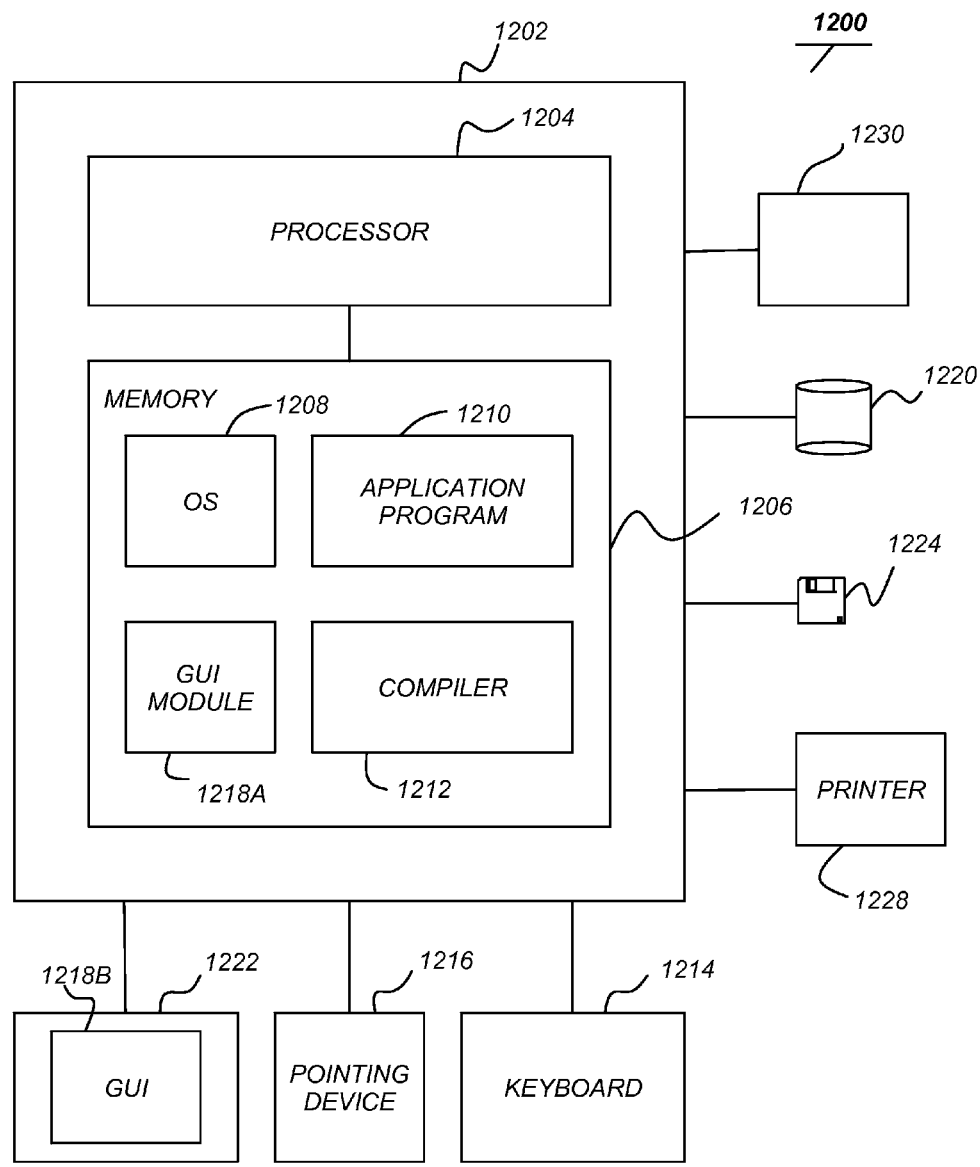
FIG. 12 illustrates an exemplary computer system that could be used to implement the processors in the gaming stations or payout stations.

FIG. 12 illustrates an exemplary computer system 1200 that could be used to implement the processors 206, 216. The computer 1202 comprises a computer processor 1204 and a memory, such as random access memory (RAM) 1206. The computer 1202 is operatively coupled to a user interface 210, 220 which may include a display 1222, which presents images such as windows to the user on a graphical user interface 1218B and other devices, such as a keyboard 1214, a mouse device 1216, a printer, etc. Of course, those skilled in the art will recognize that any combination of the above components, or any number of different components, peripherals, and other devices, may be used with the computer 1202.

Generally, the computer 1202 operates under control of an operating system 1208 stored in the memory 1206, and interfaces with the user to accept inputs and commands and to present results through a graphical user interface (GUI) module 1218A. Although the GUI module 1218A is depicted as a separate module, the instructions performing the GUI functions can be resident or distributed in the operating system 108, the application program 1210, or implemented with special purpose memory and processors. The computer 1202 also implements a compiler 1212 which allows an application program 1210 written in a programming language such as COBOL, C++, FORTRAN, or other language to be translated into processor 1204 readable code. After completion, the application 1210 accesses and manipulates data stored in the memory 1206 of the computer 1202 using the relationships and logic that was generated using the compiler 1212.

In one embodiment, instructions implementing the operating system 1208, the computer program 1210, and the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, etc. Further, the operating system 1208 and the computer program 1210 are comprised of instructions which, when read and executed by the computer 1202, causes the computer 1202 to perform the steps necessary to implement and/or use the present invention. Computer program 1210 and/or operating instructions may also be tangibly embodied in memory 1206 and/or data communications devices, thereby making a computer program product or article of manufacture according to the invention. As such, the terms "article of manufacture," "program storage device," and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing is discussed in terms of crediting amounts from a RTD to a gaming station, credit may also be applied to other locations if desired, including vending machines, a saloon, or other establishment coupled to the GMPS 200.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing a payout to a player, comprising the steps of:
    accepting a cash-out command in a gaming station having a first fingerprint sensor, the cash-out command associated with a payout value;
    sensing a fingerprint of the player with the first fingerprint sensor;
    generating first fingerprint data from the fingerprint sensed by the first fingerprint sensor;
    accepting a payout command in a payout station, the payout station comprising a payout device, the payout device communicatively coupled to the gaming station;
    sensing the fingerprint of the player with a second fingerprint sensor at the payout station;
    generating second fingerprint data from the fingerprint sensed by the second fingerprint sensor;
    after accepting the payout command in the payout station, transmitting the first fingerprint data from the gaming station for comparison with the second fingerprint data; and
    paying out at least a portion of the payout value with the payout device based at least in part upon a comparison between the first fingerprint data and the second fingerprint data.

2. The method of claim 1, wherein the payout device is a remote transaction device (RTD) or another gaming station.

3. The method of claim 2, wherein the RTD is an ATM machine or check cashing machine communicatively coupled to a financial institution.

4. The method of claim 3, wherein the ATM is a legacy ATM modified to operate with the second fingerprint sensor and the gaming station.

5. The method of claim 3, wherein after the payout command is accepted in the payout station, the first fingerprint data from the gaming machine is transmitted to only the payout station.

6. The method of claim 3, wherein the first fingerprint data and the second fingerprint data are stored only until the payout value is paid out and deleted thereafter.

7. The method of claim 3, further comprising the steps of:
    deleting all first fingerprint data stored in the gaming station and all second fingerprint data stored in the payout station after paying out the payout value.

8. The method of claim 3, wherein the gaming station and the payout station together define a gaming system, and the first fingerprint data and the second fingerprint data are not transmitted external to the gaming system.

9. The method of claim 3, wherein the step of paying out at least a portion of the payout value with the payout device based at least in part upon a comparison between the first fingerprint data and the second fingerprint data comprises the steps of:
    crediting a user's financial institution account with the at least a portion of the payout value.

10. The method of claim 9, wherein the step of paying out at least a portion of the payout value with the payout device based at least in part upon a comparison between the first fingerprint data and the second fingerprint data comprises the steps of:
    crediting the user's financial institution account with a first part of the at least a portion of the payout value and paying out a second part of the at least a portion of the payout value in cash.

11. The method of claim 3, wherein the payout value includes one or more coin denominations and one or more paper denominations, and wherein the coin denomination is paid out by the gaming station and the paper denomination is paid out by the payout station.

12. The method of claim 11, wherein the one or more paper denominations include one or more paper denominations of a first value and one or more paper denominations of a second value higher than the first value, and wherein the denominations of a first value are paid by the gaming station and the denominations of the second value are paid by the payout station.

13. The method of claim 1, wherein the first fingerprint data and the second fingerprint data are compared by the payout station.

14. The method of claim 1, wherein the first fingerprint data and the second fingerprint data are compared by the gaming device.

15. An system for providing a payout to a player, comprising:
    a gaming station, having:
        a first fingerprint sensor, for sensing a fingerprint of the player;
        a processor for accepting a cash-out command associated with a payout value and for generating first fingerprint sensor data from the fingerprint sensed by the first fingerprint sensor;
    a payout station, communicatively coupled to the gaming station and to a financial institution used to complete financial transactions with customers of the financial institution, the payout station having:
        a second fingerprint sensor for sensing the fingerprint of the player;
        a second processor, communicatively coupled to the payout device and the second fingerprint sensor, for accepting a payout command and for generating second fingerprint data from the fingerprint sensed by the second fingerprint sensor;
        a payout device, communicatively coupled to the second processor, the payout device for paying out at least a portion of the payout value based at least in part upon a comparison between the first fingerprint data and the second fingerprint data;
    wherein the gaming station transmits the first fingerprint data from the gaming station for the comparison with the second fingerprint data after the payout command is accepted in the payout station.

16. The system of claim 15, wherein the payout device is a remote transaction device (RTD) or another gaming station.

17. The system of claim 16, wherein the RTD is an ATM machine or check cashing machine communicatively coupled to a financial institution.

18. The system of claim 17, wherein the ATM is a legacy ATM modified to operate with the second fingerprint sensor and the gaming station.

19. The system of claim 17, wherein after the payout command is accepted in the payout station, the first fingerprint data from the gaming machine is transmitted to only the payout station.

20. The system of claim 17, wherein the first fingerprint data and the second fingerprint data are stored only until the payout value is paid out and deleted thereafter.

21. The system of claim 17, wherein:
the gaming station deletes all first fingerprint data stored in the gaming station immediately after the payout station pays out the payout value; and
the payout station deletes all second fingerprint data stored in the payout station after paying out the payout value.

22. The system of claim 17, wherein the gaming station and the payout station together define a gaming system, and the first fingerprint data and the second fingerprint data are not transmitted external to the gaming system.

23. The system of claim 17, wherein the payout station pays out the at least a portion of the payout value by crediting a user's financial institution account with the at least a portion of the payout value.

24. The system of claim 23, wherein the payout station pays out the at least a portion of the payout value by crediting the user's financial institution account with a first part of the at least a portion of the payout value and paying out a second part of the at least a portion of the payout value in cash.

25. The system of claim 17, wherein the payout value includes one or more coin denominations and one or more paper denominations, and wherein the coin denomination is paid out by the gaming station and the paper denomination is paid out by the payout station.

26. The system of claim 25, wherein the one or more paper denominations include one or more paper denominations of a first value and one or more paper denominations of a second value higher than the first value, and wherein the denominations of a first value are paid by the gaming station and the denominations of the second value are paid by the payout station.

27. The system of claim 15, wherein the first fingerprint data and the second fingerprint data are compared by the payout station.

28. The system of claim 15, wherein the first fingerprint data and the second fingerprint data are compared by the gaming device.

29. An apparatus for providing a payout to a player, comprising the steps of:
means for accepting a cash-out command in a gaming station having a first fingerprint sensor, the cash-out command associated with a payout value;
means for sensing a fingerprint of the player with the first fingerprint sensor;
means for generating first fingerprint data from the fingerprint sensed by the first fingerprint sensor;
means for accepting a payout command in a payout station, the payout station comprising a payout device, the payout device communicatively coupled to the gaming station;
means for sensing the fingerprint of the player with a second fingerprint sensor at the payout station;
means for generating second fingerprint data from the fingerprint sensed by the second fingerprint sensor;
means for transmitting the first fingerprint data from the gaming station for comparison with the second fingerprint data after accepting the payout command in the payout station; and
means for paying out at least a portion of the payout value with the payout device based at least in part upon a comparison between the first fingerprint data and the second fingerprint data.

* * * * *